United States Patent
Swier et al.

(10) Patent No.: US 11,028,231 B2
(45) Date of Patent: Jun. 8, 2021

(54) POLYSILOXANE COMPRISING SUBSTITUENTS HAVING MULTIPLE ARYL GROUPS

(71) Applicant: Dow Silicones Corporation, Midland, MI (US)

(72) Inventors: Steven Swier, Midland, MI (US); John B. Horstman, Midland, MI (US)

(73) Assignee: Dow Silicone Corporation, Midland, MI (US)

(*) Notice: Subject to any disclaimer, the term of this patent is extended or adjusted under 35 U.S.C. 154(b) by 44 days.

(21) Appl. No.: 16/488,959

(22) PCT Filed: Apr. 30, 2018

(86) PCT No.: PCT/US2018/030128
§ 371 (c)(1),
(2) Date: Aug. 27, 2019

(87) PCT Pub. No.: WO2018/222315
PCT Pub. Date: Dec. 6, 2018

(65) Prior Publication Data
US 2020/0095378 A1  Mar. 26, 2020

Related U.S. Application Data

(60) Provisional application No. 62/513,695, filed on Jun. 1, 2017.

(51) Int. Cl.
*C08G 77/18* (2006.01)
*C08G 77/46* (2006.01)
*C08G 77/00* (2006.01)

(52) U.S. Cl.
CPC ............ *C08G 77/18* (2013.01); *C08G 77/46* (2013.01); *C08G 77/80* (2013.01)

(58) Field of Classification Search
CPC ................................ C08G 77/80; C08G 77/18
USPC .............................................................. 528/43
See application file for complete search history.

(56) References Cited

U.S. PATENT DOCUMENTS

| | | | | |
|---|---|---|---|---|
| 2,258,221 | A * | 10/1941 | Rochow | C08G 77/14 174/121 SR |
| 3,114,759 | A * | 12/1963 | Lewis | C07F 7/0874 556/447 |
| 3,385,878 | A * | 5/1968 | Wu | C08G 77/14 556/447 |
| 4,756,971 | A * | 7/1988 | Virtanen | C08G 77/04 428/405 |
| 8,637,627 | B2 | 1/2014 | Auld et al. | |
| 10,435,420 | B2 * | 10/2019 | Paulasaari | C08L 83/00 |
| 10,889,690 | B2 * | 1/2021 | Paulasaari | C07F 7/081 |
| 2009/0146324 | A1 * | 6/2009 | Auld | C08G 77/50 257/791 |
| 2013/0045292 | A1 * | 2/2013 | Zhou | C08L 83/04 425/129.1 |
| 2013/0045552 | A1 * | 2/2013 | Lyons | H01L 33/56 438/29 |
| 2018/0079761 | A1 * | 3/2018 | Paulasaari | C09D 183/08 |
| 2019/0225756 | A1 * | 7/2019 | Paulasaari | C07F 7/1804 |

FOREIGN PATENT DOCUMENTS

JP       6048066       12/2016

* cited by examiner

*Primary Examiner* — Margaret G Moore

(57) ABSTRACT

A polysiloxane comprising: (a) from 40 to 90 mole % units of formula $R^1R^2SiO_{2/2}$, (b) from 10 to 60 mole % units of formula $R^3SiO_{3/2}$, and (c) from 0 to 5 mole % units of formula $R^1R^4SiO_{2/2}$; wherein $R^1$ and $R^2$ independently are phenyl or $C_1$-$C_6$ alkyl; $R^3$ represents at least one $C_1$-$C_{30}$ hydrocarbyl group; $R^4$ is —$Ar^1$-X—$Ar^2$, where $Ar^1$ and $Ar^2$ independently are $C_6$-$C_{12}$ aryl and X is O $CH_2$; provided that the polysiloxane comprises at least one —$Ar^1$-X—$Ar^2$ group.

10 Claims, No Drawings

POLYSILOXANE COMPRISING SUBSTITUENTS HAVING MULTIPLE ARYL GROUPS

CROSS REFERENCE TO RELATED APPLICATIONS

This application is a U.S. national stage filing under 35 U.S.C. § 371 of PCT Application No. PCT/US18/030128 filed on 30 Apr. 2018, which claims the benefit of U.S. Provisional Patent Application No. 62/513,695 filed 1 Jun. 2017 under 35 U.S.C. § 119 (e). PCT Application No. PCT/US18/030128 and U.S. Provisional Patent Application No. 62/513,695 are hereby incorporated by reference.

This invention relates to a polysiloxane comprising substituents having multiple aryl groups.

Polysiloxanes comprising substituents having multiple aryl groups are known, e.g., in U.S. Pat. No. 8,637,627. However, this reference does not teach the compositions of the present invention. There is a need for a polysiloxane having high refractive index which retains its shear modulus after aging.

STATEMENT OF THE INVENTION

The present invention provides a polysiloxane comprising: (a) from 40 to 90 mole % units of formula $R^1R^2SiO_{2/2}$, (b) from 10 to 60 mole % units of formula $R^3SiO_{3/2}$, and (c) from 0 to 5 mole % units of formula $R^1R^4SiO_{2/2}$; wherein $R^1$ and $R^2$ independently are phenyl or $C_1$-$C_6$ alkyl; $R^3$ represents at least one $C_1$-$C_{30}$ hydrocarbyl group; $R^4$ is —$Ar^1$-X—$Ar^2$, where $Ar^1$ and $Ar^2$ independently are $C_6$-$C_{12}$ aryl and X is O or $CH_2$; provided that the polysiloxane comprises at least one —$Ar^1$-X—$Ar^2$ group.

DETAILED DESCRIPTION

Percentages are weight percentages (wt %) and temperatures are in ° C. unless specified otherwise. Operations were performed at room temperature unless specified otherwise. Alkyl groups are saturated hydrocarbyl groups that may be straight or branched. Preferably, alkyl groups have from one to six carbon atoms, preferably one or two. Preferably, alkyl groups are unsubstituted. Aryl groups are substituent groups derived from aromatic hydrocarbon compounds which can be mono- or poly-nuclear. Aryl groups may be substituted by $C_1$-$C_4$ alkyl and/or $C_1$-$C_4$ alkoxy groups. Preferably, aryl groups are unsubstituted.

As used herein, unless otherwise indicated, molecular weights, $M_n$, $M_w$ and $M_z$ have the conventional meanings and are determined by gel permeation chromatography. Molecular weights are reported herein in units of g/mol.

The polysiloxane comprises at least one —$Ar^1$-X—$Ar^2$ group. Preferably, —$Ar^1$-X—$Ar^2$ groups are present: (i) as one or more of the $C_1$-$C_{30}$ hydrocarbyl groups represented by $R^3$, (ii) when the polysiloxane comprises more than 0 mole % units of formula $R^1R^4SiO_{2/2}$, or a combination of (i) and (ii). Preferably, $R^3$ represents no more than five different $C_1$-$C_{30}$ hydrocarbyl groups, preferably no more than four, preferably no more than three. Preferably, $R^3$ groups are $C_1$-$C_{20}$ hydrocarbyl groups, preferably $C_1$-$C_{15}$, preferably $C_6$-$C_{15}$. Preferably, $R^3$ groups are selected from the group consisting of $C_1$-$C_{12}$ alkyl, $C_1$-$C_{12}$ cycloalkyl, $C_6$-$C_{30}$ aryl or a combination thereof; preferably, $C_6$-$C_{30}$ aryl groups are phenyl, have formula —$Ar^1$-$Ar^2$ or a combination thereof; preferably $R^3$ groups are selected from the group consisting of $C_1$-$C_6$ alkyl, phenyl, —$Ar^1$-X—$Ar^2$ or a combination thereof. Preferably, $Ar^1$ and $Ar^2$ independently are $C_6$-$C_{12}$ aryl, preferably $C_6$-$C_8$ aryl, preferably phenyl.

Preferably, $R^1$ and $R^2$ independently are phenyl or $C_1$-$C_4$ alkyl; preferably phenyl, methyl or ethyl; preferably methyl or phenyl, preferably methyl. In preferred embodiment, $R^1$ is methyl and $R^2$ is phenyl or $C_1$-$C_6$ alkyl; preferably $R^2$ is phenyl or $C_1$-$C_4$ alkyl, preferably methyl or phenyl. Preferably, X is $CH_2$.

Preferably, the polysiloxane comprises: (a) from 45 to 80 mole % units of formula $R^1R^2SiO_{2/2}$ (—$OSi(R^1)(R^2)$)— units or D units), (b) from 20 to 55 mole % units of formula $R^3SiO_{3/2}$ ("T" units), and (c) from 0 to 3 mole % units of formula $R^1R^4SiO_{2/2}$. Preferably, units of formula $R^1R^4SiO_{2/2}$ comprise no more than 2 mole % of the polysiloxane, preferably no more than 1 mole %, preferably no more than 0.5 mole %, preferably no more than 0.2 mole %. Preferably, the polysiloxane comprises from 40 to 70 mole % units of formula $R^1R^2SiO_{2/2}$, preferably from 50 to 65 mole %. Preferably, the polysiloxane comprises from 30 to 60 mole % units of formula $R^3SiO_{3/2}$, preferably from 30 to 45 mole %.

Preferably, siloxane units comprising —$Ar^1$-X—$Ar^2$ comprise at least 5 wt % of the polysiloxane, preferably at least 10 wt %, preferably at least 15 wt %, preferably at least 20 wt %, preferably at least 25 wt %, preferably at least 30 wt %; preferably no more than 50 wt %, preferably no more than 45 wt %.

Preferably, the D units (e.g., $R^1R^2SiO_{2/2}$ and $R^1R^4SiO_{2/2}$) are present in the form of a linear polymer having from 30 to 200 D units; preferably at least 50, preferably at least 70, preferably at least 80; preferably no more than 170, preferably no more than 150, preferably no more than 140, preferably no more than 130. Preferably, the polysiloxane is produced by coupling a linear polysiloxane comprising D units with one or more T units.

In a preferred embodiment, the polysiloxane comprises: (a) from 40 to 85 mole % units of formula $R^1R^2SiO_{2/2}$, (b) from 5 to 55 mole % units of formula $R^5SiO_{3/2}$, and (c) from 10 to 55 mole % units of formula $R^4SiO_{3/2}$; wherein $R^1$ and $R^2$ independently are phenyl or $C_1$-$C_6$ alkyl; $R^5$ is phenyl or $C_1$-$C_6$ alkyl; $R^4$ is —$Ar^1$-X—$Ar^2$, where $Ar^1$ and $Ar^2$ independently are $C_6$-$C_{12}$ aryl and X is O or $CH_2$. Preferably, $R^5$ is phenyl or $C_1$-$C_4$ alkyl, preferably methyl or phenyl. Preferably, the polysiloxane comprises: (a) from 40 to 70 mole % units of formula $R^1R^2SiO_{2/2}$, (b) from 10 to 40 mole % units of formula $R^5SiO_{3/2}$, and (c) from 10 to 40 mole % units of formula $R^4SiO_{3/2}$. Preferably, X is $CH_2$.

EXAMPLES

Abbreviations: MTA-methyltriacetoxysilane, ETA-ethyltriacetoxysilane
45 wt % Phenyl-T Resin+55 wt % 124 dp PhMe

C. Ex. 1

A 5 L 4 neck round bottom flask was loaded with toluene (764.1 g) and phenyl-T resin—Dow Corning 217 flake (900.0 g, 6.589 mols Si). The flask was equipped with a thermometer, teflon stir paddle, and a Dean Stark apparatus attached to a water-cooled condenser. A nitrogen blanket was applied, Dean Stark was prefilled with toluene, and a heating mantle was used for heating.

Heated resin solution at reflux for 30 minutes to dry the resin. In a separate vessel, a toluene solution of silanol terminated PhMe siloxane (124 dp, 1.25 mol % SiOH, 1669.2 g solution=1100.0 g siloxane, 8.065 mols Si) was capped with a 50/50 molar ratio of MTA/ETA (24.06 g, 0.1059 mols Si). It was prepared in a glove box (same day) under nitrogen by adding the 50/50 MTA/ETA to the siloxane and mixing at room temperature for 1 hour.

RL Coupling

Cooled resin solution a couple of degrees below reflux and then added the siloxane solution quickly. Heated at reflux for 2 hrs.

RR Coupling

Cooled reaction down to 100° C. and then added 50/50 MTA/ETA (157.3 g, 0.692 mols). Heated at reflux for 1 hr.

Repeated the following process 3×: [Cooled reaction to 90° C. and then added DI water (215.6 g). Heated to reflux and removed water by azeotropic distillation.] Distilled off volatiles (667 g) to increase the solids content up to 75%. Heated at reflux for 3 hours. Dean Stark was still attached and was prefilled with toluene before reflux started. Cooled to room temperature and then pressure filtered through a 5.0 um filter.

Results: Cast films were optically clear.

45 wt % Phenyl-T Resin+55 wt % 113 dp PhMe

C. Ex. 2

A 5 L 4 neck round bottom flask was loaded with toluene (766.66 g) and phenyl-T resin—Dow Corning 217 flake (900.0 g, 6.589 mols Si). The flask was equipped with a thermometer, teflon stir paddle, and a Dean Stark apparatus attached to a water-cooled condenser. A nitrogen blanket was applied, Dean Stark was prefilled with toluene, and a heating mantle was used for heating.

Heated resin solution at reflux for 30 minutes to dry the resin. In a separate vessel, a toluene solution of silanol terminated PhMe siloxane (113 dp, 1.32 mol % SiOH, 1666.67 g solution=1100.0 g siloxane, 0.112 mols Si) was capped with a 50/50 molar ratio of MTA/ETA (25.41 g, 0.112 mols Si). It was prepared in a glove box (same day) under nitrogen by adding the 50/50 MTA/ETA to the siloxane and mixing at room temperature for 1 hour.

RL Coupling

Cooled resin solution a couple of degrees below reflux and then added the siloxane solution quickly. Heated at reflux for 2 hrs.

RR Coupling

Cooled reaction down to 100° C. and then added 50/50 MTA/ETA (157.3 g, 0.692 mols). Heated at reflux for 1 hr.

Repeated the following process 2×: [Cooled reaction to 90° C. and then added DI water (217 g). Heated to reflux and removed water by azeotropic distillation.] Distilled off volatiles (673.4 g) to increase the solids content up to 75%. Heated at reflux for 2 hours. Added toluene (296.3 g) and then DI water (217 g). Heated to reflux and removed water by azeotropic distillation. Distilled off some volatiles (306.2 g) to increase the solids content back up to 75%. Cooled to room temperature and then pressure filtered through a 5.0 um filter.

Results: Cast films were optically clear.

45 wt % Phenoxyphenyl-phenyl Resin+55 wt % 90 dp PhMe

Ex. 1

A 500 mL 4 neck round bottom flask was loaded with phenoxyphenyl-phenyl resin solution (145.63 g resin dissolved in toluene=90.0 g solids, 0.495 mols Si) and toluene (18.47 g). The composition of the resin was a 50/50 molar ratio phenoxyphenyl-T/phenyl-T with 57.2 mol % OH, 6.8 mol % OMe, Mw=1540 (relative to polystyrene standards in THF) made from phenoxyphenyltrimethoxysilane and phenyltrimethoxysilane. The flask was equipped with a thermometer, teflon stir paddle, and a Dean Stark apparatus attached to a water-cooled condenser. A nitrogen blanket was applied, Dean Stark was prefilled with toluene, and a heating mantle was used for heating. Heated resin solution at reflux for 30 minutes to dry the resin. In a separate vessel, a toluene solution of silanol terminated PhMe siloxane (90 dp, 1.86 mol % SiOH, 169.23 g solution=110.0 g siloxane, 0.806 mols Si) was capped with MTA (3.47 g, 0.0158 mols Si). It was prepared in a glove box (same day) under nitrogen by adding the MTA to the siloxane and mixing at room temperature for 1 hour.

RL Coupling

Cooled resin solution a couple of degrees below reflux and then added the siloxane solution quickly. Heated at reflux for 2 hrs.

RR Coupling

Cooled reaction down to 106° C. Added MTA (5.45 g, 0.0247 mols). Heated at reflux for 1 hr. Cooled to ~90° C. and then added DI water (18.2 g). Heated at reflux and removed water by azeotropic distillation. Cooled to 106° C. and then added more MTA (2.73 g, 0.0124 mols). Heated at reflux for 1 hour. Cooled to ~90° C. Added DI water (18.2 g) and then heated at reflux to remove water by azeotropic distillation. Cooled to 106° C. and then added more MTA (1.64 g, 0.00745 mols). Heated at reflux for 1 hour. Cooled to ~90° C. Added DI water (18.2 g) and then heated at reflux to remove water by azeotropic distillation.

Cooled reaction to ~90° C. and then added DI water (18.2 g). Heated to reflux and removed water by azeotropic distillation. Distilled off some volatiles (48.0 g) and then added toluene (48.0 g). Added more DI water (18.2 g). Heated back up to reflux and removed water by azeotropic distillation. Distilled off some volatiles (53.0 g) to increase the solids content. Cooled to room temperature and then pressure filtered through a 5.0 um filter.

Results: Cast films were optically clear.

45 wt % Biphenyl-phenyl Resin+55 wt % 90 dp PhMe

Ex. 2—NOTE: Ex. 2 is a "Comparative Example"

A 500 mL 4 neck round bottom flask was loaded with biphenyl-phenyl resin solution (145.87 g resin dissolved in toluene=90.0 g solids, 0.516 mols Si) and toluene (18.23 g). The composition of the resin was a 50/50 molar ratio biphenyl-T/phenyl-T with 56.1 mol % OH, 8.7 mol % OMe, Mw=2035(relative to polystyrene standards in THF) made from biphenyltrimethoxysilane and phenyltrimethoxysilane. The flask was equipped with a thermometer, teflon stir paddle, and a Dean Stark apparatus attached to a water-cooled condenser. A nitrogen blanket was applied, Dean Stark was prefilled with toluene, and a heating mantle was used for heating. Heated resin solution at reflux for 30 minutes to dry the resin. In a separate vessel, a toluene solution of silanol terminated PhMe siloxane (90 dp, 1.86 mol % SiOH, 169.23 g solution=110.0 g siloxane, 0.806 mols Si) was capped with MTA (3.47 g, 0.0158 mols Si). It was prepared in a glove box (same day) under nitrogen by adding the MTA to the siloxane and mixing at room temperature for 1 hour.

RL Coupling

Cooled resin solution a couple of degrees below reflux and then added the siloxane solution quickly. Heated at reflux for 2 hrs.

RR Coupling

Cooled reaction down to 106° C. Added MTA (5.68 g, 0.0258 mols). Heated at reflux for 1 hr.

Cooled reaction to ~90° C. and then added DI water (18.7 g). Heated at reflux and removed water by azeotropic distillation. Cooled back down to ~90° C. and then added more DI water (18.7 g). Heated to reflux and removed water by azeotropic distillation. Distilled off some volatiles (47.5 g) and then added toluene (47.5 g). Added more DI water (18.7 g). Heated back up to reflux and removed water by azeotropic distillation. Distilled off some volatiles (42.1 g) to increase the solids content. Cooled to room temperature and then pressure filtered through a 5.0 um filter.

Results: Cast films were optically clear.

45 wt % Phenoxyphenyl Resin+55 wt % 90 dp PhMe

Ex. 3

A 500 mL 4 neck round bottom flask was loaded with phenoxyphenyl resin solution (122.2 g resin dissolved in toluene=72.0 g solids, 0.316 mols Si) and toluene (9.07 g). The composition of the resin was 100% phenoxyphenyl-T with 64.1 mol % OH, 2.8 mol % OMe, Mw=2498(relative to polystyrene standards in THF) made from phenoxyphenyltrimethoxysilane. The flask was equipped with a thermometer, teflon stir paddle, and a Dean Stark apparatus attached to a water-cooled condenser. A nitrogen blanket was applied, Dean Stark was prefilled with toluene, and a heating mantle was used for heating. Heated resin solution at reflux for 30 minutes to dry the resin. In a separate vessel, a toluene solution of silanol terminated PhMe siloxane (90 dp, 1.86 mol % SiOH, 135.4 g solution=88.0 g siloxane, 0.645 mols Si) was capped with MTA (2.78 g, 0.0126 mols Si). It was prepared in a glove box (same day) under nitrogen by adding the MTA to the siloxane and mixing at room temperature for 1 hour.

RL Coupling

Cooled resin solution a couple of degrees below reflux and then added the siloxane solution quickly. Heated at reflux for 2 hrs.

RR Coupling

Cooled reaction down to 108° C. Added MTA (2.09 g, 0.00949 mols). Heated at reflux for 1 hr. Cooled to ~90° C. and then added DI water (19.9 g). Heated at reflux and removed water by azeotropic distillation. Cooled to 108° C. and then added more MTA (1.39 g, 0.00632 mols). Heated at reflux for 1 hour. Cooled to ~90° C. Added DI water (19.9 g) and then heated at reflux to remove water by azeotropic distillation. Cooled to 108° C. and then added more MTA (1.39 g, 0.00632 mols). Heated at reflux for 1 hour. Cooled to ~90° C. Added DI water (19.9 g) and then heated at reflux to remove water by azeotropic distillation.

Distilled off some volatiles (53.1 g) and then added toluene (23.7 g). Added more DI water (19.9 g). Heated back up to reflux and removed water by azeotropic distillation. Distilled off some volatiles (22.8 g) to increase the solids content. Cooled to room temperature and then pressure filtered through a 5.0 um filter.

Results: Cast films were optically clear.

45 wt % Biphenyl-phenoxyphenyl Resin+55 wt % 90 dp PhMe

Ex. 4—NOTE: Ex. 4 is a "Comparative Example"

A 500 mL 4 neck round bottom flask was loaded with biphenyl-phenoxyphenyl resin solution (131.96 g resin dissolved in toluene=90.0 g solids, 0.408 mols Si) and toluene (32.14 g). The composition of the resin was 50/50 molar ratio biphenyl-T/phenoxyphenyl-T with 58.1 mol % OH, 8.1 mol % OMe, Mw=2063(relative to polystyrene standards in THF) made from biphenyltrimethoxysilane and phenoxyphenyltrimethoxysilane. The flask was equipped with a thermometer, teflon stir paddle, and a Dean Stark apparatus attached to a water-cooled condenser. A nitrogen blanket was applied, Dean Stark was prefilled with toluene, and a heating mantle was used for heating. Heated resin solution at reflux for 30 minutes to dry the resin. In a separate vessel, a toluene solution of silanol terminated PhMe siloxane (90 dp, 1.86 mol % SiOH, 169.23 g solution=110.0 g siloxane, 0.806 mols Si) was capped with MTA (3.47 g, 0.0158 mols Si). It was prepared in a glove box (same day) under nitrogen by adding the MTA to the siloxane and mixing at room temperature for 1 hour.

RL Coupling

Cooled resin solution a couple of degrees below reflux and then added the siloxane solution quickly. Heated at reflux for 2 hrs.

RR Coupling

Cooled reaction down to 106° C. Added MTA (4.49 g, 0.0204 mols). Heated at reflux for 1 hr. Cooled to ~90° C. and then added DI water (16.3 g). Heated at reflux and removed water by azeotropic distillation. Cooled to 106° C. and then added more MTA (0.90 g, 0.00409 mols). Heated at reflux for 1 hour. Cooled to ~90° C. Added DI water (16.3 g) and then heated at reflux to remove water by azeotropic distillation.

Cooled to ~90° C. Added DI water (16.3 g) and then heated at reflux to remove water by azeotropic distillation. Distilled off some volatiles (66.1 g) and then added toluene (41.0 g). Added more DI water (16.3 g). Heated back up to reflux and removed water by azeotropic distillation. Distilled off some volatiles (36.5 g) to increase the solids content. Cooled to room temperature and then pressure filtered through a 5.0 um filter.

Results: Cast films were optically clear.

45 wt % Phenyl-T Resin+55 wt % 99 dp phenoxyphenyl-methyl siloxane

C. Ex. 3

A 500 mL 4 neck round bottom flask was loaded with phenyl-T resin—Dow Corning 217 flake (90.0 g, 0.659 mols Si) and toluene (72.0 g). The flask was equipped with a thermometer, teflon stir paddle, and a Dean Stark apparatus attached to a water-cooled condenser. A nitrogen blanket was applied, Dean Stark was prefilled with toluene, and a heating mantle was used for heating. Heated resin solution at reflux for 30 minutes to dry the resin. In a separate vessel, a toluene solution of silanol terminated phenoxyphenyl-methyl siloxane (99 dp, 1.41 mol % SiOH, 171.3 g solution=110.0 g siloxane, 0.489 mols Si) was capped with MTA (1.59 g, 0.00722 mols Si). It was prepared in a glove box (same day) under nitrogen by adding the MTA to the siloxane and mixing at room temperature for 1 hour.

RL Coupling

Cooled resin solution a couple of degrees below reflux and then added the siloxane solution quickly. Heated at reflux for 2 hrs.

RR Coupling

Cooled reaction down to 106° C. Added MTA (10.89 g, 0.0494 mols). Heated at reflux for 1 hr. Cooled to ~90° C. and then added DI water (21.7 g). Heated at reflux and removed water by azeotropic distillation. Cooled to 106° C. and then added more MTA (2.90 g, 0.0132 mols). Heated at reflux for 1 hour. Cooled to ~90° C. Added DI water (21.7 g) and then heated at reflux to remove water by azeotropic distillation.

Cooled to ~90° C. Added DI water (21.7 g) and then heated at reflux to remove water by azeotropic distillation. Distilled off some volatiles (65.8 g) and then added toluene (65.8 g). Added more DI water (21.7 g). Heated back up to reflux and removed water by azeotropic distillation. Distilled off some volatiles (66.3 g) to increase the solids content. Cooled to room temperature and then pressure filtered through a 5.0 um filter.
Results: Cast films were optically clear.
45 wt % Biphenyl-phenyl Resin+55 wt % 99 dp phenoxyphenyl-methyl siloxane C. Ex. 4

A 500 mL 4 neck round bottom flask was loaded with biphenyl-phenyl resin solution (145.87 g resin dissolved in toluene=90.0 g solids, 0.516 mols Si) and toluene (16.16 g). The composition of the resin was a 50/50 molar ratio biphenyl-T/phenyl-T with 56.1 mol % OH, 8.7 mol % OMe, Mw=2035(relative to polystyrene standards in THF) made from biphenyltrimethoxysilane and phenyltrimethoxysilane. The flask was equipped with a thermometer, teflon stir paddle, and a Dean Stark apparatus attached to a water-cooled condenser. A nitrogen blanket was applied, Dean Stark was prefilled with toluene, and a heating mantle was used for heating. Heated resin solution at reflux for 30 minutes to dry the resin. In a separate vessel, a toluene solution of silanol terminated phenoxyphenyl-methyl siloxane (99 dp, 1.41 mol % SiOH, 171.3 g solution=110.0 g siloxane, 0.489 mols Si) was capped with MTA (1.59 g, 0.00722 mols Si). It was prepared in a glove box (same day) under nitrogen by adding the MTA to the siloxane and mixing at room temperature for 1 hour.
RL Coupling
Cooled resin solution a couple of degrees below reflux and then added the siloxane solution quickly. Heated at reflux for 2 hrs.
RR Coupling
Cooled reaction down to 106° C. Added MTA (5.68 g, 0.0258 mols). Heated at reflux for 1 hr. Cooled reaction to ~90° C. and then added DI water (21.7 g). Heated at reflux and removed water by azeotropic distillation.
Cooled back down to ~90° C. and then added more DI water (21.7 g). Heated to reflux and removed water by azeotropic distillation. Distilled off some volatiles (67.2 g) and then added toluene (67.2 g). Added more DI water (21.7 g). Heated back up to reflux and removed water by azeotropic distillation. Distilled off some volatiles (55.7 g) to increase the solids content.
Cooled to room temperature and then pressure filtered through a 5.0 um filter.
Results: Cast films were optically clear.
45 wt % Biphenyl-phenyl Resin+55 wt % 96 dp polydimethylsiloxane Ex. 5

A 1 L 4 neck round bottom flask was loaded with biphenyl-phenyl resin solution (141.29 g resin dissolved in toluene=90.0 g solids, 0.519 mols Si) and toluene (260.9 g). The composition of the resin was a 50/50 molar ratio biphenyl-T/phenyl-T with 49.9 mol % OH, 7.3 mol % OMe, Mw=2590 (relative to polystyrene standards in THF) made from biphenyltrimethoxysilane and phenyltrimethoxysilane. The flask was equipped with a thermometer, teflon stir paddle, and a Dean Stark apparatus attached to a water-cooled condenser. A nitrogen blanket was applied, Dean Stark was prefilled with toluene, and a heating mantle was used for heating. Heated resin solution at reflux for 30 minutes to dry the resin. In a separate vessel, silanol terminated polydimethylsiloxane (96 dp, 2.08 mol % SiOH, 110.0 g siloxane, 1.478 mols Si)+toluene (59.23 g) was capped with 50/50 MTA/ETA (7.34 g, 0.0323 mols Si). It was prepared in a glove box (same day) under nitrogen by adding the MTA/ETA to the siloxane and mixing at room temperature for 1 hour.
RL Coupling
Cooled resin solution a couple of degrees below reflux and then added the siloxane solution quickly. After about 5 minutes at reflux some toluene (95.2 g) was added in order to turn the solution clear. Heated at reflux for 2 hrs.
RR Coupling
Distilled off some toluene (167.8 g) to increase the solids content to 40 wt %. Cooled reaction down to 106° C. Added 50/50 MTA/ETA (3.54 g, 0.0156 mols). Heated at reflux for 1 hr. Cooled reaction to ~90° C. and then added DI water (21.7 g). Heated at reflux and removed water by azeotropic distillation.
Added some toluene (60.0 g). At ~90° C. added DI water (21.7 g). Heated to reflux and removed water by azeotropic distillation. Added more DI water (21.7 g). Heated back up to reflux and removed water by azeotropic distillation. Distilled off some volatiles (60 g) to increase the solids content. Cooled to room temperature and then pressure filtered through a 5.0 um filter.
Results: Cast films were optically clear.
45 wt % Phenyl-T Resin+55 wt % 95 dp polydimethylsiloxane C. Ex. 5

A 3 L 4 neck round bottom flask was loaded with phenyl-T resin—Dow Corning 217 flake (378.0 g, 2.77 mols Si) and toluene (1011.3 g). The flask was equipped with a thermometer, teflon stir paddle, and a Dean Stark apparatus attached to a water-cooled condenser. A nitrogen blanket was applied, Dean Stark was prefilled with toluene, and a heating mantle was used for heating. Heated resin solution at reflux for 30 minutes to dry the resin. In a separate vessel, silanol terminated polydimethylsiloxane (95 dp, 2.10 mol % SiOH, 462.0 g siloxane, 6.21 mols Si)+toluene (248.75 g) was capped with 50/50 MTA/ETA (31.12 g, 0.137 mols Si). It was prepared in a glove box (same day) under nitrogen by adding the MTA/ETA to the siloxane and mixing at room temperature for 1 hour.
RL Coupling
Cooled resin solution a couple of degrees below reflux and then added the siloxane solution quickly. Heated at reflux for 2 hrs.
RR Coupling
Cooled reaction down to 108° C. Added 50/50 MTA/ETA (25.18 g, 0.1108 mols). Heated at reflux for 1 hr. Cooled to ~90° C. and then added DI water (89.3 g). Heated at reflux and removed water by azeotropic distillation. Cooled to 108° C. and then added more 50/50 MTA/ETA (3.15 g, 0.0139 mols). Heated at reflux for 1 hour. Cooled to ~90° C. Added DI water (89.3 g) and then heated at reflux to remove water by azeotropic distillation.
At ~90° C. added DI water (89.3 g). Heated to reflux and removed water by azeotropic distillation.
Distilled off some volatiles (884.6 g). Added some toluene (201.3 g). Added more DI water (89.3 g). Heated back up to reflux and removed water by azeotropic distillation. Cooled to ~90° C. Added more DI water (89.3 g). Heated back up to reflux and removed water by azeotropic distillation. Distilled off some volatiles (202.9 g) to increase the solids content.
Cooled to room temperature and then pressure filtered through a 5.0 um filter.
Results: Cast films were optically clear.

| | Resin Block (45 wt %) (Si molar fractions) | | | Polymer Block (55 wt %) | | | |
|---|---|---|---|---|---|---|---|
| Nb # | BP-T | POP-T | Ph-T | PhMe (dp, mol % OH) | POP-Si-Me (dp, mol % OH) | PDMS (dp, mol % OH) | wt % Cyclics |
| C. Ex.1 | — | — | 1 | 124, 1.25 | — | — | 1.33 |
| C. Ex. 2 | — | — | 1 | 113, 1.32 | — | — | 1.30 |
| Ex. 1 | — | 0.5 | 0.5 | 90, 1.86 | — | — | 1.71 |
| Ex. 2 | 0.5 | — | 0.5 | 90, 1.86 | — | — | 1.71 |
| Ex. 3 | — | 1 | — | 90, 1.86 | — | — | 1.71 |
| Ex. 4 | 0.5 | 0.5 | — | 90, 1.86 | — | — | 1.71 |
| C. Ex. 3 | — | — | 1 | — | 99, 1.41 | — | 7.53 |
| C. Ex. 4 | 0.5 | — | 0.5 | — | 99, 1.41 | — | 7.53 |
| Ex. 5 | 0.5 | — | 0.5 | — | — | 96, 2.08 | n/a |
| C. Ex. 5 | — | — | 1 | — | — | 95, 2.10 | n/a |

| | Resin Linear Characterization | | | | | |
|---|---|---|---|---|---|---|
| | CF# | OZ (mol %) | $M_w$ g/mol | % (R + Cyclics) | RI | NVC, % |
| C. Ex. 1 | 10.5 | 18.5 | 75,500 | 14.8 | 1.556 | 74.6 |
| C. Ex. 2 | 10.5 | 19.5 | 78,200 | 15.4 | 1.556 | 74.5 |
| Ex. 1 | 9 | 15.9 | 88,200 | 14.4 | 1.567 | 72.1 |
| Ex. 2 | 5 | 17.6 | 141,000 | 12 | 1.576 | 69.9 |
| Ex. 3 | 7 | 13.0 | 89,300 | 22 | 1.576 | 77.3 |
| Ex. 4 | 6 | 13.2 | 63,400 | 15.6 | 1.581 | 75.0 |
| C. Ex. 3 | 9.5 | 27.0 | 65,600 | 22.8 | 1.581 | 76.1 |
| C. Ex. 4 | 5 | 24.0 | 64,500 | 28.2 | 1.600 | 74.6 |
| Ex. 5 | 3 | 9.8 | 373,000 | 18.7 | 1.485 | 39.5 |
| C. Ex. 5 | 4.5 | n/a | 50,600 | 34.4 | 1.466 | 69.5 |

The materials described above were exposed to 225° C. under air for 500 hrs. DMTA was used to measure the shear modulus (G') at different temperatures and study the stability of these materials. As can be seen from the results presented below, especially the materials that incorporate biphenyl moieties and no phenoxyphenyl groups exhibit great modulus stability (see last column, Modulus change at 23° C. MPa/hr<0.2). Dynamic Mechanical Thermal Analysis of 50 ppm DBU cured slabs initial and aged 500 hrs@225° C. Conditions: start −50° C. scan to 350° C. at 5° C./min (Film Tension, Sum amplitude, 1 Hz); samples were cured up to 3 h at 160° C. prior to the test.

| Ex. | DMTA (Cured) | | | | | | | | |
|---|---|---|---|---|---|---|---|---|---|
| | Tg 1 Linear Tan δ Peak 1 (° C.) | Tg 2 intermed. Tanδ inflection (° C.) | Tg 3 Resin Tan δ Peak 2 (° C.) | Tan delta avg ($T_g1$-$T_g3$) | CTE ΔL ($T_g1$-$T_g$ 3) (ppm/° C.) | G' @ 23° C. (Mpa) | G' @ 120° C. (Mpa) | G' @ 200° C. (Mpa) | Change in Modulus @ 23° C. (Mpa/hr) |
| 1 | 10.6 | NA | 36 | 0.011 | 241 | 50 | 1 | 1 | |
| 1 Aged | 14.8 | NA | 41 | 0.016 | 288 | 107 | 1 | 1 | 0.11 |
| C. 4 | 19.8 | 97 | NA | 0.030 | 294 | 695 | 27 | 16 | |
| C. 4 Aged | 23.4 | 122 | NA | NA | 309 | 1005 | 29 | 16 | 0.62 |
| C. 3 | 16.5 | NA | 275 | 0.115 | 348 | 449 | 23 | 8 | |
| C. 3 Aged | 23.5 | NA | NA | NA | 309 | 941 | 26 | 15 | 0.98 |
| 4 | −1.8 | NA | 87 | NA | 120 | 155 | 3 | 2 | |
| 4 Aged | −0.5 | NA | 77 | NA | 121 | 143 | 3 | 2 | −0.02 |
| 2 | −4.6 | 97 | ** | 0.093 | 284 | 251 | 43 | 20 | |
| 2 Aged | −1.9 | * | NA | 0.106 | 312 | 310 | 42 | 20 | 0.12 |
| C. 1 | −6.2 | 79 | 285 | 0.101 | 315 | 186 | 35 | 13 | |
| C. 1 Aged | −2.7 | 76 | >350 | NA | 355 | 254 | 37 | 20 | 0.13 |
| C. 2 | 0.5 | NA | 262 | 0.114 | 356 | 208 | 31 | 10 | |
| C. 2 Aged | −1.1 | 77 | >350 | NA | 344 | 232 | 30 | 16 | 0.05 |

\* 61.9/132.4 Bimodal peaks
\** 229 inflection in graph

The invention claimed is:

1. A polysiloxane comprising: (a) from 40 to 90 mole % units of formula $R^1R^2SiO_{2/2}$, (b) from 30 to 60 mole % units of formula $R^3SiO_{3/2}$, and (c) from 0 to 5 mole % units of formula $R'R^4SiO_{2/2}$; wherein $R^1$ and $R^2$ independently are phenyl or $C_1$-$C_6$ alkyl; $R^3$ represents at least one $C_1$-$C_{30}$ hydrocarbyl group; $R^4$ is —$Ar^1$-X—$Ar^2$, where $Ar^1$ and $Ar^2$ independently are $C_6$-$C_{12}$ aryl and X is O or $CH_2$; provided that the polysiloxane comprises at least one —$Ar^1$-X—$Ar^2$ group.

2. The polysiloxane of claim 1 in which $R^3$ represents no more than five different $C_1$-$C_{20}$ hydrocarbyl groups selected from the group consisting of $C_1$-$C_{12}$ alkyl, $C_5$-$C_{12}$ cycloalkyl, $C_6$-$C_{30}$ aryl and a combination thereof.

3. The polysiloxane of claim 2 in which $C_6$-$C_{30}$ aryl groups are phenyl, —$Ar^1$-X—$Ar^2$ or a combination thereof where X is $CH_2$.

4. The polysiloxane of claim 3 comprising: (a) from 45 to 80 mole % units of formula $R^1R^2SiO_{2/2}$, (b) from 20 to 55 mole % units of formula $R^3SiO_{3/2}$, and (c) from 0 to 3 mole % units of formula $R'R^4SiO_{2/2}$.

5. The polysiloxane of claim 4 in which $R^3$ represents no more than four different $C_1$-$C_{30}$ hydrocarbyl groups selected from the group consisting of $C_1$-$C_6$ alkyl, phenyl, —$Ar^1$-X—$Ar^2$ or a combination thereof; wherein $Ar^1$ and $Ar^2$ are $C_6$-$C_8$ aryl.

6. The polysiloxane of claim 5 in which $R^1R^2SiO_{2/2}$ and $R^1R^4SiO_{2/2}$ units are present as part of a linear polysiloxane chain.

7. A polysiloxane comprising: (a) from 40 to 85 mole % units of formula $R^1R^2SiO_{2/2}$, (b) from 5 to 55 mole % units of formula $R^5SiO_{3/2}$, and (c) from 10 to 55 mole % units of formula $R^4SiO_{3/2}$; wherein $R^1$ and $R^2$ independently are phenyl or $C_1$-$C_6$ alkyl; $R^5$ is phenyl or $C_1$-$C_6$ alkyl; $R^4$ is —$Ar^1$-X—$Ar^2$, where $Ar^1$ and $Ar^2$ independently are $C_6$-$C_{12}$ aryl and X is O or $CH_2$.

8. The polysiloxane of claim 7 in which $R^1$ is methyl and $R^2$ is phenyl or $C_1$-$C_4$ alkyl.

9. The polysiloxane of claim 8 in which $Ar^1$ and $Ar^2$ are phenyl and X is $CH_2$.

10. The polysiloxane of claim 9 in which $R^5$ is phenyl or $C_1$-$C_4$ alkyl.

* * * * *